Dec. 27, 1927. 1,653,963
L. KRAL
MAGNESIUM BURNER AND LAMP
Filed April 30, 1924  2 Sheets-Sheet 1

Inventor
L. Kral
by Marks & Clerk
Attys.

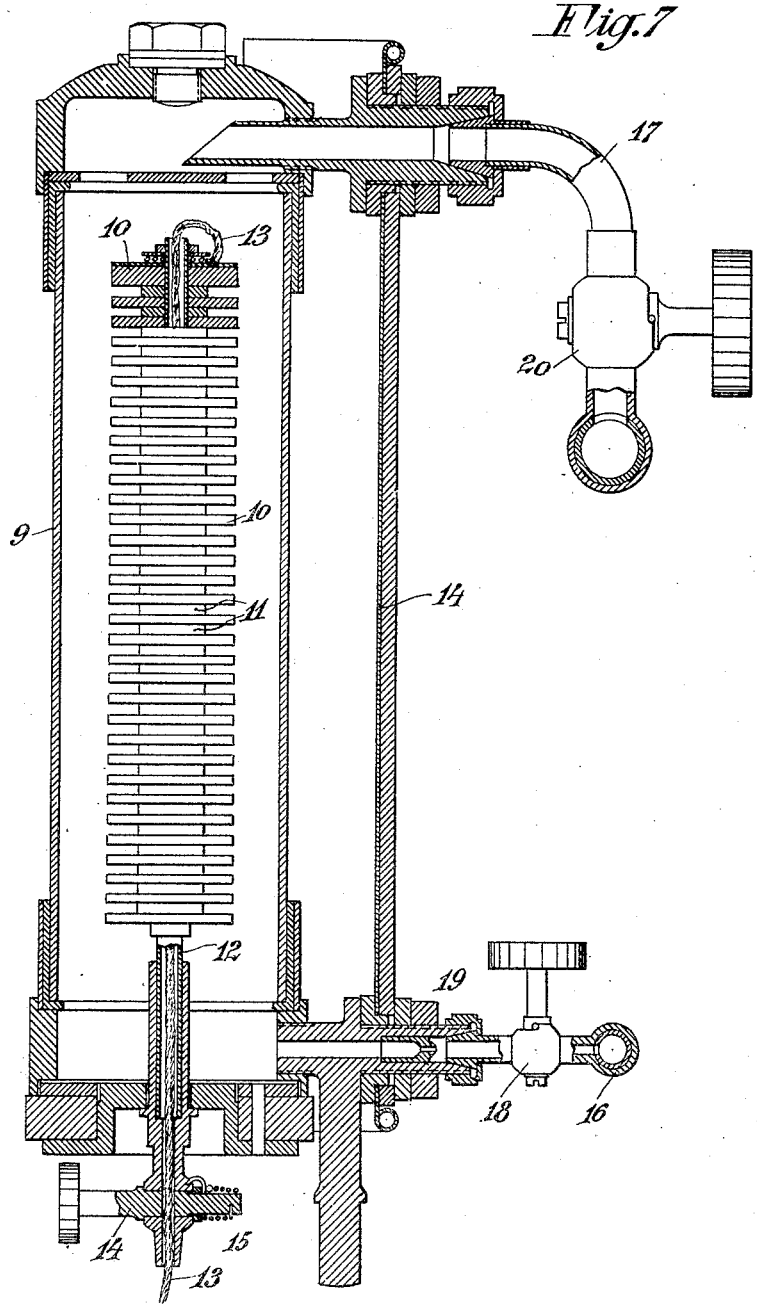

Patented Dec. 27, 1927.

1,653,963

UNITED STATES PATENT OFFICE.

LUDWIG KRAL, OF VIENNA, AUSTRIA.

MAGNESIUM BURNER AND LAMP.

Application filed April 30, 1924, Serial No. 710,200, and in Austria May 5, 1923.

This invention relates to a magnesium burner and lamp which are mainly used for photographic objects.

Particularly for photographic objects in case it is desired to make a continuous light it is of the greatest importance to harmonize the burning speed of the magnesium and suppress as much as possible the development of smoke.

Now it has been found, that these two requirements are in a very intimate connection with one another and may be influenced to a great extent by the chemical character of the surface of the magnesium, as well as also by the manner in which the burner is built up.

The characteristic feature of the present invention consists in that the magnesium, which is used in the shape of bands, strips, plates, discs or in a pulverized state and so forth, at first is subjected to a chemical alteration at the surface (which hereinafter will be termed oxidation) and subsequently the material thus prepared is formed into the shape of a cylindrically shaped burner (candle) by means of winding, folding, superpositioning and so forth.

Further a candle composed of a number of superposed magnesium-plates is supplied with sufficient oxygen for the combustion in that the individual plates are provided with centrally disposed elevations, which form between the individual plates a suitable space for the admission of the air of combustion in case the plates are superposed upon one another in such a manner, that the middles of the plates rest tightly against each other.

Also an increase of the surface of combustion is obtained owing to the fact, that only the centres of the plates rest upon one another.

If desired intermediate plates of a smaller diameter may be loosely disposed between the plates in place of the centrally arranged elevation on each plate.

The intermediate plates may be composed of substances which yield oxygen, for instance oxides and superoxides of alkaline earths or heavy metals and so forth, whereby during the combustion of the candle oxygen is supplied also from the inside.

If desired the intermediate plates may be composed of an indifferent material (for instance magnesia usta), which prevents the fast burning away, as only the glowing intermediate layer ignites the next plate. Particularly in the latter case it is of advantage to supply oxygen or oxygenated air under pressure into the cylinder containing the candle in order to obtain a suitable burning away.

Further the present invention relates to a lamp for such burners, which essentially consists of a cylinder which is made of glass or another transparent material and is provided with an adjustable air-supply and encloses the burner.

Several modes of carrying out the present invention are shown by way of example on the accompanying sheets of drawings in which—

Fig. 7 shows a modified construction of the lamp in section with a burner composed of superposed plates, which are separated by intermediate layers.

Figure 1:
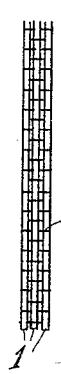
Fig. 1 shows the material of which the burner is composed in the original state, and Fig. 2 the same in the twisted or contorted condition.

The material of which the burner is composed (Fig. 1) consists of small parallel magnesium strips or bands 1, which are braided together by means of very thin copper wires 2 to form a broader band.

Now this material is provided with a very thin film of oxyde, for instance by quickly drawing it through a very diluted nitric acid. In place of the nitric acid any other solution in a correspondingly diluted condition may be employed which chemically alters the surface of the magnesium.

Figure 2:
Figure 3:
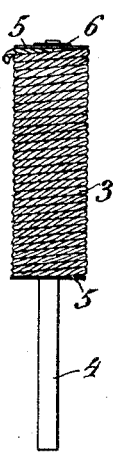
Figs. 3 and 4 illustrate two burners formed by the contorted material.
Figure 4:
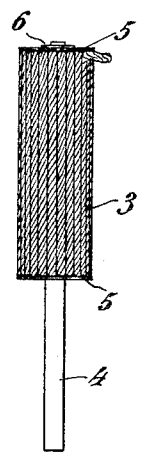

The material thus prepared is twisted into the shape of a cord 3 (Fig. 2), which is spirally wound (Fig. 3) or longitudinally arranged side by side (Fig. 4) to form a cylindrically shaped member and which is placed on an iron mandrel or bar 4, the top and bottom of the burner being closed up by means of sheet metal plates 5, which hold together the burner and prevent the admission of air into the interior of the cylinder.

The top end of the bar 4 is screw-threaded and the burner is screwed down by means of a flat nut 6.

Figure 5:
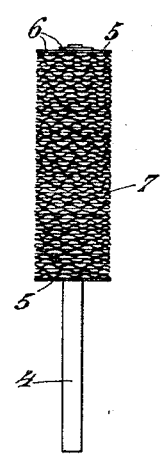
Fig. 5 shows a burner composed of circular sheet-metal plates.

Fig. 5 shows a modified burner, the magnesium bands being displaced by circular discs, which consist of thin magnesium-metal and are furnished with a centrally disposed hole and with radially arranged corrugations. The surface oxidation is carried out in the same manner as has been described with respect to the bands. The discs are piled up on an iron-bar 4 between the sheet metal plates 5 and are screwed together by the nut 6. In place of employing the magnesium in the manner of sheet-metal and in the shape of a band or disc, also disc-shaped members may be pressed of magnesium-powder, which are subjected to a surface-oxidation according to the present invention. These discs are also piled-up on an iron-bar.

The burners produced in this manner are ignited at the top and burn down slowly and evenly with a very small development of smoke, thereby producing a very great illuminating power.

The amount of the supplied air of combustion is of the greatest importance for the burning-speed and the development of smoke. It has been proven by experiments, that a large excess of air of combustion increases the development of smoke and that a decrease in the supply of air renders it possible to suppress the development of smoke to such an extent, that it is possible to burn down the burner within a lamp-chimney or glass without depositing any magnesia thereon.

Figure 6:
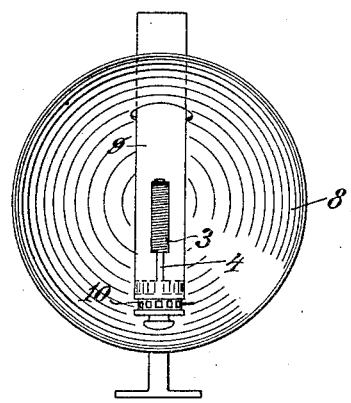
Fig. 6 is a front view of a lamp constructed according to the present invention.

Fig. 6 shows a search-light lamp particularly adapted for taking kinematographic pictures. The burner 3 is secured by means of the bar 4 in a concave mirror 8 and is enclosed in a chimney 9, which is mounted on a regulating sleeve 10 provided with a number of air-slots. After igniting the burner the chimney is placed over the latter just in the same way as is the case with an ordinary lamp and the air-supply is adjusted to the least possible development of smoke or to the desired speed of burning.

Fig. 7 illustrates a lamp which is provided with a tightly closed cylinder 9 in which the burner is arranged, the latter being formed by a number of superposed plates 10 of magnesium or the like, which are separated from one another by intermediate plates 11 of a smaller diameter. All plates are mounted on a tube 12, through which a fuse or match-rope 13 is passing, the latter being secured to the top plate 10. The match-rope 13 passes through a cock 14 of the lamp, which is retained in a position so as to clamp the rope by means of a spring 15. Owing to the action of this spring the cock 14 is immediately shut after the match-rope has burned down and thus causes an air-tight closure of the lamp. A pipe 16 for supplying oxygen or a mixture of oxygen and air passes into the bottom of the lamp and a pipe 17 for the exhaust of the gases of combustion is in communication with the top of the lamp.

The supply-pipe 16 is furnished with a shut-off cock 18 and a nozzle 19. The latter warrants a uniform passing-in of the oxygen or the like even in case two or more supply-pipes are connected to the pipe 16.

A certain pressure is necessary in the cylinder 9 in order to provide for a corresponding burning down of the candle. A larger heat of combustion is obtained with a greater pressure and the consequence is an increased activity. However although the long exhaust tubes call for an increased pressure, the adjustment of a throttle cock 20 arranged in the exhaust pipe renders possible any desired increase of the pressure.

A reflector 8 is arranged behind the cylinder 9.

If desired any number of lamps may be coupled or connected with one another, e. g. they may be provided with a common supply-pipe as well as with a common exhaust-pipe, or any desired number of candles may be disposed within a common cylinder.

Of course the burner according to the present invention may be burned down without being enclosed in a lamp.

I claim:—

1. A magnesium burner comprising a plurality of magnesium members whose surfaces are subjected to a chemical alteration and which are built up to form a cylindrically shaped member, and a sheet-metal plate disposed at both ends of the cylindrically shaped member.

2. A magnesium burner comprising a plurality of magnesium plates whose surfaces are subjected to a chemical alteration and which are built up to form a cylindrically shaped member, each plate being provided with a centrally disposed elevation which provides a connection and leaves a suitable clearance between the individual plates.

3. A magnesium burner comprising a plurality of magnesium plates whose surfaces are subjected to a chemical alteration, and intermediate layers, the said plates and layers being alternately built up to form a cylindrically shaped member whereby the intermediate layers form a connection and leave a suitable clearance between the individual plates.

4. A magnesium burner comprising a plurality of magnesium plates whose surfaces are subjected to a chemical alteration, and intermediate layers formed of an oxygen-yielding substance, the said plates and layers being alternately built-up to form a cylindrically shaped member whereby the intermediate layers form a connection and leave a suitable clearance between the individual plates.

5. A magnesium burner comprising a plurality of magnesium plates whose surfaces are subjected to a chemical alteration, a tube on which the individual plates are arranged to form a cylindrically shaped member, each plate being provided with a centrally disposed elevation which provides a connection between and leaves a suitable clearance between the individual plates, and a fuse passing through the said tube.

6. A magnesium burner comprising a plurality of magnesium plates whose surfaces are subjected to a chemical alteration, intermediate layers, a tube on which the said plates and layers are arranged alternately to form a cylindrically shaped member whereby the intermediate layers form a connection and leave a suitable clearance between the individual plates, and a fuse passing through the said tube.

7. A magnesium burner comprising a plurality of magnesium plates whose surfaces are subjected to a chemical alteration, intermediate layers formed of an oxygen-yielding substance, a tube on which the said plates and layers are arranged alternately to form a cylindrically shaped member whereby the intermediate layers form a connection and leave a suitable clearance between the individual plates, and a fuse passing through the said tube.

8. A lamp comprising in combination a magnesium burner composed of magnesium members whose surfaces are subjected to a chemical alteration, a fuse passing through the said burner, a transparent cylinder surrounding the said burner, an adjustable air-supply provided at the bottom of the said cylinder, and a cock arranged at the place of entry of the fuse which is automatically closed when the fuse has burned down and thus closes the lamp with respect to the outside.

9. A lamp comprising in combination a magnesium burner composed of magnesium members whose surfaces are subjected to a chemical alteration, a transparent cylinder surrounding the said burner, an adjustable air-supply provided at the bottom of the said cylinder, a pipe for supplying oxygen and a pipe for leading away the gases of combustion connected to the lamp.

10. A lamp comprising in combination a magnesium burner composed of magnesium members whose surfaces are subjected to a chemical alteration, a transparent cylinder surrounding the said burner, an adjustable air-supply provided at the bottom of the said cylinder, a pipe for supplying oxygen connected to the lamp, a nozzle for compensating any variation in pressure mounted in the said pipe, and a pipe for leading away the gases of combustion connected to the lamp.

11. A lamp comprising in combination a magnesium burner composed of magnesium members whose surfaces are subjected to a chemical alteration, a transparent cylinder surrounding the said burner, an adjustable air-supply provided at the bottom of the said cylinder, a pipe for supplying oxygen connected to the lamp, a pipe for leading away the gases of combustion connected to the lamp, and a throttle-member for regulating the pressure mounted in the pipe last mentioned.

In testimony whereof I hereunto affix my signature.

LUDWIG KRAL.